(12) United States Patent
Kellogg et al.

(10) Patent No.: US 10,010,049 B2
(45) Date of Patent: *Jul. 3, 2018

(54) COLLAPSIBLE KENNEL

(71) Applicant: SportPet Designs, Inc., Waukesha, WI (US)

(72) Inventors: Adam M. Kellogg, Oconomowoc, WI (US); Kelly C. Kellogg, Oconomowoc, WI (US)

(73) Assignee: SPORTPET DESIGNS, INC., Waukesha, WI (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/904,605

(22) Filed: May 29, 2013

(65) Prior Publication Data

US 2014/0352626 A1    Dec. 4, 2014

(51) Int. Cl.
| | |
|---|---|
| *A01K 1/03* | (2006.01) |
| *A01K 31/00* | (2006.01) |
| *A01K 31/07* | (2006.01) |
| *A01K 1/02* | (2006.01) |

(52) U.S. Cl.
CPC ............ *A01K 1/034* (2013.01); *A01K 1/0245* (2013.01); *A01K 1/033* (2013.01)

(58) Field of Classification Search
USPC ....... 119/416, 482, 496, 497, 498, 474, 452, 119/499, 28.5, 453, 500, 501; D30/108, D30/118, 109, 114; 135/125, 126, 128; 383/104; 220/9.2, 9.3, 9.1, 9.4, 4.28, 6, 220/7, 4.33; 224/586; D32/36

See application file for complete search history.

(56) References Cited

U.S. PATENT DOCUMENTS

| | | |
|---|---|---|
| 177,749 A | 3/1876 | Redden |
| 216,227 A | 6/1879 | Sedgwick |
| 217,362 A | 7/1879 | Gardner |
| 218,277 A | 8/1879 | Kilham |
| 251,325 A | 12/1881 | Walters |
| 288,654 A | 11/1883 | Morse |

(Continued)

FOREIGN PATENT DOCUMENTS

| | | |
|---|---|---|
| DE | 281680 | 8/1913 |
| DE | 2015649 | 2/1971 |

(Continued)

OTHER PUBLICATIONS

Ware, Twist-N-Go Carrier, Med., Item No. 02151; http://web.archive.org/web/20110105183219/http://www.waremfginc.com/sa-detaildisplay.aspx?itemno=02151; retrieved from internet wayback machine dated Jan. 5, 2011; 1 page.*

(Continued)

*Primary Examiner* — Andrea M Valenti

(74) *Attorney, Agent, or Firm* — Michael Best & Friedrich LLP

(57) ABSTRACT

A collapsible enclosure having a top panel, a bottom panel, two side panels, a front panel having an opening, and a rear panel. The top panel, bottom panel, two side panels, front panel, and rear panel are connected to one another to form a substantially rectangular enclosure having a door in the opening for ingress and egress. The side panels include a peripheral edging containing a looped frame. A method of collapsing the kennel is also disclosed.

17 Claims, 8 Drawing Sheets

(56) References Cited

U.S. PATENT DOCUMENTS

| | | |
|---|---|---|
| 338,892 A | 3/1886 | Walker |
| 344,340 A | 6/1886 | Barrow |
| 356,301 A | 1/1887 | Belknap |
| 414,622 A | 11/1889 | Willits |
| 481,957 A | 9/1892 | Klank |
| 665,942 A | 1/1901 | Tabler |
| 679,612 A | 7/1901 | Evans |
| 844,955 A | 2/1907 | Morgan |
| 929,430 A | 7/1909 | Hill |
| 945,918 A | 1/1910 | Crawford |
| 975,745 A | 11/1910 | Bower |
| 1,087,702 A | 2/1914 | Van Patten |
| 1,108,615 A * | 8/1914 | Paul .................. B65D 37/00 220/9.2 |
| 1,135,892 A | 4/1915 | Grosenbeck |
| 1,144,643 A | 6/1915 | Elkins |
| 1,155,475 A | 10/1915 | Fay |
| 1,159,323 A | 11/1915 | Maltby |
| 1,167,497 A | 1/1916 | Hayes |
| 1,180,574 A | 4/1916 | Despot |
| 1,181,829 A | 5/1916 | Bower |
| 1,206,618 A | 11/1916 | Thrasher |
| 1,251,560 A | 1/1918 | Myskow |
| 1,263,294 A | 4/1918 | Taylor |
| 1,303,736 A | 5/1919 | Speicher |
| 1,308,268 A | 7/1919 | Wagner et al. |
| 1,360,844 A | 11/1920 | Williams |
| 1,394,007 A | 10/1921 | Hall |
| 1,451,468 A | 4/1923 | Olshan |
| 1,520,532 A | 12/1924 | Clark |
| 1,538,260 A | 5/1925 | Street et al. |
| 1,581,888 A | 4/1926 | Thomas |
| 1,583,083 A | 5/1926 | Macaraig |
| 1,640,083 A | 8/1927 | Ladd |
| 1,647,679 A | 11/1927 | Williams |
| 1,691,904 A | 11/1928 | Gamble |
| 1,703,066 A | 2/1929 | Horn |
| 1,793,362 A | 2/1931 | Graves |
| 1,832,715 A | 11/1931 | London |
| 1,836,297 A | 12/1931 | Vienna |
| 1,979,978 A | 11/1934 | Martin |
| 1,994,235 A | 3/1935 | Solomon |
| 1,999,424 A | 4/1935 | Seitz |
| 2,009,035 A | 7/1935 | Towers |
| 2,016,520 A | 10/1935 | Short |
| 2,042,888 A | 6/1936 | Flood |
| 2,057,942 A | 10/1936 | Fay |
| 2,071,850 A | 2/1937 | Miller |
| 2,115,308 A | 4/1938 | Koch |
| 2,136,761 A | 11/1938 | Simmons |
| 2,182,932 A | 12/1939 | Sanford |
| 2,269,574 A | 1/1942 | Benenfeld |
| 2,280,601 A | 4/1942 | Otter |
| 2,295,584 A | 9/1942 | Larson |
| 2,298,786 A | 10/1942 | Dubofsky et al. |
| 2,361,743 A | 10/1944 | Butler |
| 2,470,223 A | 3/1945 | Powel |
| 2,517,757 A | 8/1950 | Alderstein |
| 2,544,074 A | 3/1951 | Ernst et al. |
| 2,575,893 A | 11/1951 | Seaman |
| 2,600,501 A | 6/1952 | Higgs |
| 2,625,973 A | 1/1953 | Weldon et al. |
| 2,639,819 A | 5/1953 | Marks |
| 2,664,131 A | 12/1953 | Miller |
| 2,710,084 A | 6/1955 | Braverman |
| 2,721,099 A | 10/1955 | Rupp |
| 2,724,537 A | 11/1955 | Fehr |
| 2,746,582 A | 5/1956 | Cart |
| 2,761,480 A | 9/1956 | Tames |
| 2,767,757 A | 10/1956 | Marder |
| 2,778,560 A | 1/1957 | Pfeiffer |
| 2,780,402 A | 2/1957 | Zucker et al. |
| 2,833,460 A | 5/1958 | Votolato |
| 2,879,553 A | 3/1959 | Keating |
| 2,936,771 A | 5/1960 | Marchfield et al. |
| 2,958,357 A | 11/1960 | Vorgan |
| 3,014,516 A | 12/1961 | Mueller |
| 3,017,117 A | 1/1962 | Klingler |
| 3,061,396 A | 10/1962 | Hock |
| 3,105,505 A | 10/1963 | Maybee |
| 3,126,933 A | 3/1964 | Mason et al. |
| 3,160,307 A | 12/1964 | Morrison |
| 3,233,644 A | 2/1966 | Bono |
| 3,257,077 A | 6/1966 | Corning |
| 3,260,396 A | 7/1966 | Buch |
| 3,265,284 A | 8/1966 | Tompkins |
| 3,310,089 A | 3/1967 | Silverman |
| 3,354,924 A | 11/1967 | Birrell et al. |
| 3,373,925 A | 3/1968 | Gatward |
| 3,410,328 A | 11/1968 | Sasai |
| D213,131 S | 1/1969 | Hamilton |
| 3,434,589 A | 3/1969 | Valtri et al. |
| 3,439,865 A | 4/1969 | Port et al. |
| D215,846 S | 11/1969 | Curtin et al. |
| 3,480,059 A | 11/1969 | Schoening |
| 3,481,311 A | 12/1969 | Schluttig |
| 3,502,091 A | 3/1970 | Corbin |
| 3,583,748 A | 6/1971 | Arndt |
| 3,603,367 A | 9/1971 | Lehrman |
| 3,661,326 A | 5/1972 | Wilson |
| 3,675,667 A | 7/1972 | Miller |
| 3,675,981 A | 7/1972 | Mallander |
| 3,696,850 A | 10/1972 | Rosenblum |
| 3,709,237 A | 1/1973 | Smith |
| 3,727,786 A | 4/1973 | Fausel |
| 3,732,978 A | 5/1973 | Reader |
| 3,733,758 A | 5/1973 | Maier et al. |
| 3,796,342 A | 3/1974 | Sanders et al. |
| 3,799,384 A | 3/1974 | Hurkamp |
| 3,807,421 A | 4/1974 | Geiger et al. |
| 3,834,528 A | 9/1974 | Pickford et al. |
| 3,843,222 A | 10/1974 | Berkun |
| 3,868,155 A | 2/1975 | Cherubini |
| 3,880,459 A | 4/1975 | Kelley |
| 3,883,026 A | 5/1975 | Selz |
| 3,893,649 A | 7/1975 | Cornell et al. |
| 3,935,958 A | 2/1976 | Frangos |
| 3,946,903 A | 3/1976 | Parker |
| 3,955,706 A | 5/1976 | Whitaker |
| 3,960,161 A | 6/1976 | Norman |
| 3,987,580 A | 10/1976 | Ausnit |
| 3,990,463 A | 11/1976 | Norman |
| 4,010,784 A | 3/1977 | Nattrass et al. |
| 4,011,611 A | 3/1977 | Lederman |
| 4,055,239 A | 10/1977 | Weiner |
| 4,073,105 A | 2/1978 | Daugherty |
| 4,094,639 A | 6/1978 | McMillan |
| 4,118,089 A | 10/1978 | Johnson et al. |
| 4,133,149 A | 1/1979 | Angress |
| 4,134,225 A | 1/1979 | Welch |
| 4,165,757 A | 8/1979 | Marks |
| 4,170,082 A | 10/1979 | Freedman |
| 4,180,113 A | 12/1979 | Liebling |
| 4,195,804 A | 4/1980 | Hujsak et al. |
| 4,212,130 A | 7/1980 | Walker |
| 4,212,377 A | 7/1980 | Weinreb |
| 4,246,945 A | 1/1981 | Sterling |
| 4,248,278 A | 2/1981 | Blodgett |
| 4,248,442 A | 2/1981 | Barrett |
| 4,265,261 A | 5/1981 | Barker |
| 4,287,701 A | 9/1981 | Washington |
| 4,299,365 A | 11/1981 | Battle |
| 4,304,068 A | 12/1981 | Beder |
| 4,313,634 A | 2/1982 | Williams |
| 4,352,457 A | 10/1982 | Weick |
| 4,388,739 A | 6/1983 | Martinon et al. |
| 4,401,213 A | 8/1983 | Lerner |
| D270,939 S | 10/1983 | Stehlik |
| 4,411,300 A | 10/1983 | Rico |
| 4,427,110 A | 1/1984 | Shaw, Jr. |
| 4,428,484 A | 1/1984 | Rattay et al. |
| D274,662 S | 7/1984 | Fausel |
| 4,485,855 A | 12/1984 | Dillingham |
| D279,249 S | 6/1985 | Fausel |

(56) References Cited

U.S. PATENT DOCUMENTS

| | | |
|---|---|---|
| 4,550,440 A | 10/1985 | Rico |
| 4,580,776 A | 4/1986 | Burkinshaw |
| 4,585,283 A | 4/1986 | Redmon et al. |
| 4,590,885 A | 5/1986 | Sugiura |
| 4,603,432 A | 7/1986 | Marino |
| 4,610,394 A | 9/1986 | Bryson |
| 4,630,312 A | 12/1986 | Milstein |
| 4,630,747 A | 12/1986 | Chiang et al. |
| 4,632,138 A | 12/1986 | Irwin |
| D288,019 S | 1/1987 | Gebhard et al. |
| 4,635,411 A | 1/1987 | Kurzen |
| 4,642,934 A | 2/1987 | Carlson et al. |
| 4,646,802 A | 3/1987 | Basore et al. |
| D290,538 S | 6/1987 | Basore |
| 4,683,927 A | 8/1987 | Pyzer |
| 4,697,357 A | 10/1987 | Van Vliet |
| 4,706,845 A | 11/1987 | Schnurer et al. |
| 4,715,572 A | 12/1987 | Robbins, III et al. |
| 4,716,918 A | 1/1988 | Hayashida et al. |
| 4,728,066 A | 3/1988 | Lang et al. |
| 4,730,748 A | 3/1988 | Bane |
| 4,738,478 A | 4/1988 | Bean, Jr. |
| 4,747,701 A | 5/1988 | Perkins |
| 4,752,008 A | 6/1988 | Pratt |
| 4,759,518 A | 7/1988 | Yardas |
| 4,779,794 A | 10/1988 | Moore |
| 4,781,300 A | 11/1988 | Long |
| 4,783,031 A | 11/1988 | Ebentheuer |
| 4,784,248 A | 11/1988 | Workman |
| 4,790,029 A | 12/1988 | LaFleur et al. |
| 4,803,957 A | 2/1989 | Davis |
| 4,812,054 A | 3/1989 | Kirkendall |
| 4,813,520 A | 3/1989 | Lin |
| 4,815,784 A | 3/1989 | Zheng |
| 4,825,892 A | 5/1989 | Norman |
| 4,842,032 A | 6/1989 | Mastronardo |
| 4,852,520 A | 8/1989 | Goetz |
| 4,854,501 A | 8/1989 | Ricci |
| 4,858,561 A | 8/1989 | Springer |
| 4,858,634 A | 8/1989 | McLese |
| 4,862,602 A | 9/1989 | Krill |
| 4,876,829 A | 10/1989 | Mattick |
| 4,899,967 A | 2/1990 | Johnson |
| 4,903,584 A | 2/1990 | Styles |
| 4,925,102 A | 5/1990 | Jones et al. |
| 4,895,230 A | 6/1990 | King |
| 4,940,200 A | 7/1990 | Sawyer et al. |
| 4,946,118 A | 8/1990 | Hastings |
| 4,948,077 A | 8/1990 | Gonzalez |
| 4,951,333 A | 8/1990 | Kaiser et al. |
| 4,953,815 A | 9/1990 | Beymer et al. |
| 4,964,859 A | 10/1990 | Feldman |
| 4,989,749 A | 2/1991 | Choi |
| 4,995,487 A | 2/1991 | Plath |
| D315,432 S | 3/1991 | Smith |
| 5,007,250 A | 4/1991 | Musielak |
| 5,009,189 A | 4/1991 | Neff |
| 5,011,008 A | 4/1991 | Baker |
| 5,022,767 A | 6/1991 | Cardulla |
| 5,024,262 A | 6/1991 | Huang |
| 5,027,748 A | 7/1991 | Wolak |
| 5,031,277 A | 7/1991 | Coker |
| 5,031,793 A | 7/1991 | Chen et al. |
| 5,035,460 A | 7/1991 | Huang |
| 5,036,999 A | 8/1991 | Bitsch |
| 5,038,812 A | 8/1991 | Norman |
| 5,054,507 A | 10/1991 | Sparks |
| 5,072,828 A | 12/1991 | Irvine |
| 5,082,219 A | 1/1992 | Blair |
| 5,090,588 A | 2/1992 | Van Romer et al. |
| RE33,842 E | 3/1992 | Ebentheuer |
| 5,116,138 A | 5/1992 | Mascenti et al. |
| 5,118,201 A | 6/1992 | Cook |
| 5,134,815 A | 8/1992 | Pickett |
| 5,137,044 A | 8/1992 | Brady |
| 5,143,283 A | 9/1992 | Lancaster |
| 5,174,462 A | 12/1992 | Hames |
| 5,195,649 A | 3/1993 | Wolters |
| 5,197,154 A | 3/1993 | Shamie |
| 5,213,147 A | 5/1993 | Zheng |
| 5,222,513 A | 6/1993 | Hilliard |
| 5,230,304 A | 7/1993 | Santoro |
| 5,253,775 A | 10/1993 | Gould |
| 5,263,672 A | 11/1993 | He |
| 5,273,142 A | 12/1993 | Weber |
| 5,301,705 A | 4/1994 | Zheng |
| 5,316,060 A | 5/1994 | Hodgdon et al. |
| 5,320,065 A | 6/1994 | Leopold |
| 5,324,490 A | 6/1994 | Van Vlahakis et al. |
| 5,335,805 A | 8/1994 | Chen |
| 5,343,887 A | 9/1994 | Danaher |
| 5,356,024 A | 10/1994 | Ho et al. |
| 5,358,440 A | 10/1994 | Zheng |
| 5,375,267 A | 12/1994 | Davis |
| 5,382,087 A | 1/1995 | Pouch |
| 5,393,023 A | 2/1995 | Callan |
| 5,394,897 A | 3/1995 | Ritchey et al. |
| 5,411,046 A | 5/1995 | Wan |
| 5,429,437 A | 7/1995 | Shaw et al. |
| 5,437,384 A | 8/1995 | Farrell |
| 5,437,410 A | 8/1995 | Babasade |
| 5,449,083 A | 9/1995 | Dougherty et al. |
| 5,452,681 A | 9/1995 | Ho |
| 5,464,113 A | 11/1995 | Ho et al. |
| 5,467,794 A | 11/1995 | Zheng |
| 5,468,061 A | 11/1995 | Friess et al. |
| 5,472,280 A | 12/1995 | Rittmaster |
| 5,474,196 A * | 12/1995 | Fausel et al. ............ 220/4.28 |
| 5,484,078 A | 1/1996 | Bronovicki |
| 5,492,675 A | 2/1996 | Brizard |
| 5,560,385 A | 10/1996 | Zheng |
| 5,576,621 A | 11/1996 | Clements |
| 5,593,046 A | 1/1997 | Katsuura et al. |
| 5,620,069 A | 4/1997 | Hurwitz |
| 5,653,194 A | 8/1997 | Guy |
| 5,664,596 A | 9/1997 | Zheng |
| 5,664,886 A | 9/1997 | Hutchinson |
| 5,669,331 A * | 9/1997 | Richmond ............... 119/497 |
| 5,671,479 A | 9/1997 | Dedrick |
| 5,722,446 A | 3/1998 | Zheng |
| 5,746,514 A | 5/1998 | Orensten |
| 5,762,530 A | 6/1998 | Zheng |
| 5,778,915 A | 7/1998 | Zheng |
| D397,756 S | 9/1998 | Hagerty |
| 5,800,067 A | 9/1998 | Easter |
| 5,816,279 A | 10/1998 | Zheng |
| 5,816,954 A | 10/1998 | Zheng |
| 5,827,104 A | 10/1998 | Zheng |
| 5,845,697 A | 12/1998 | Zheng |
| 5,853,313 A | 12/1998 | Zheng |
| 5,862,624 A | 1/1999 | Askins |
| D406,423 S | 3/1999 | Kellogg et al. |
| D407,765 S | 4/1999 | Zheng |
| 5,901,926 A | 5/1999 | Zheng |
| 5,906,290 A | 5/1999 | Haberkorn |
| 5,910,038 A | 6/1999 | Zheng |
| 5,910,058 A | 6/1999 | Zheng |
| 5,927,793 A | 7/1999 | McGrath, Jr. |
| 5,938,496 A | 8/1999 | Zheng |
| 5,941,265 A | 8/1999 | Zheng |
| 5,960,744 A | 10/1999 | Rutman |
| 5,960,983 A | 10/1999 | Chan |
| 5,964,533 A | 10/1999 | Ziglar |
| 5,967,090 A | 10/1999 | Hui |
| 5,967,357 A | 10/1999 | Kellogg et al. |
| 5,971,188 A | 10/1999 | Kellogg et al. |
| 5,971,410 A | 10/1999 | Niichols |
| 5,975,101 A | 11/1999 | Zheng |
| 5,992,045 A | 11/1999 | Kellogg et al. |
| 5,992,676 A | 11/1999 | Tsai |
| D417,977 S | 12/1999 | Veto |
| 6,006,772 A | 12/1999 | Zheng |
| 6,021,740 A | 2/2000 | Martz |
| 6,059,912 A | 5/2000 | Kellogg et al. |

(56) References Cited

U.S. PATENT DOCUMENTS

| | | | |
|---|---|---|---|
| 6,076,485 A | 6/2000 | Peeples et al. | |
| 6,082,574 A | 7/2000 | Johnson | |
| 6,088,953 A | 7/2000 | Morgan | |
| 6,089,394 A | 7/2000 | Ziglar | |
| 6,092,488 A | 7/2000 | Allawas | |
| 6,102,569 A | 8/2000 | Wang | |
| 6,109,281 A | 8/2000 | Lowenthal | |
| D431,361 S | 10/2000 | Kellogg et al. | |
| 6,129,051 A * | 10/2000 | Jessie et al. | 119/452 |
| D433,810 S | 11/2000 | Kellogg et al. | |
| D438,009 S | 2/2001 | Kellogg et al. | |
| 6,209,557 B1 | 4/2001 | Zheng | |
| 6,220,998 B1 | 4/2001 | Kellogg et al. | |
| 6,269,826 B1 | 8/2001 | Zheng | |
| D449,447 S | 10/2001 | Kellogg et al. | |
| 6,305,396 B1 | 10/2001 | Zheng | |
| 6,311,709 B1 | 11/2001 | Louie et al. | |
| 6,345,591 B1 * | 2/2002 | Richmond | 119/497 |
| 6,360,760 B1 | 3/2002 | Louie et al. | |
| 6,360,761 B1 | 3/2002 | Zheng | |
| 6,363,955 B1 | 4/2002 | Louie | |
| 6,390,111 B2 | 5/2002 | Zheng | |
| D461,638 S | 8/2002 | Kellogg et al. | |
| 6,427,631 B1 | 8/2002 | Ross | |
| 6,439,165 B1 | 8/2002 | Guard | |
| 6,446,577 B1 | 9/2002 | Salahor | |
| RE37,924 E | 12/2002 | Kellogg et al. | |
| 6,494,335 B1 | 12/2002 | Kellogg et al. | |
| 6,502,595 B2 | 1/2003 | Louie | |
| 6,516,751 B2 | 2/2003 | Burns | |
| 6,527,136 B1 | 3/2003 | Sabounjian | |
| 6,585,414 B2 | 7/2003 | Peska | |
| 6,604,537 B2 | 8/2003 | Zheng | |
| 6,668,847 B2 * | 12/2003 | Zheng | A63B 9/00 135/125 |
| 6,681,720 B1 | 1/2004 | Skurdalsvold et al. | |
| 6,688,256 B1 | 2/2004 | King | |
| 6,698,382 B1 | 3/2004 | Blaszak et al. | |
| 6,702,119 B2 | 3/2004 | Sabounjian | |
| 6,705,338 B2 | 3/2004 | Zheng | |
| 6,708,742 B2 | 3/2004 | Weathers et al. | |
| 6,715,446 B2 | 4/2004 | Chou | |
| D494,367 S | 8/2004 | Yang | |
| 6,782,905 B2 | 8/2004 | Chu et al. | |
| RE38,591 E | 9/2004 | Kellogg et al. | |
| D501,063 S | 1/2005 | Bertolli | |
| 6,848,460 B2 | 2/2005 | Zheng | |
| 6,851,136 B2 | 2/2005 | Brereton | |
| 6,890,009 B2 | 3/2005 | Smith | |
| 6,874,797 B2 | 4/2005 | Gardenour | |
| 6,899,057 B1 | 5/2005 | Chrisco | |
| 6,901,940 B2 | 6/2005 | Zheng | |
| 6,926,020 B2 | 8/2005 | Zheng | |
| 6,948,632 B2 | 9/2005 | Kellogg et al. | |
| D512,799 S | 12/2005 | Simpson | |
| 6,974,167 B2 | 12/2005 | Springs, II | |
| 6,983,965 B1 | 1/2006 | Bergell | |
| 6,997,138 B1 | 2/2006 | Simpson | |
| 6,997,338 B2 | 2/2006 | Sabounjian | |
| D518,243 S | 3/2006 | Weidner | |
| 7,014,096 B2 | 3/2006 | Hinds | |
| D519,280 S | 4/2006 | Kellogg et al. | |
| 7,021,242 B2 | 4/2006 | Axelrod | |
| 7,044,083 B2 | 5/2006 | Farmer | |
| 7,044,277 B2 | 5/2006 | Redzisz | |
| 7,066,647 B2 | 6/2006 | Peska | |
| D524,995 S | 7/2006 | Dudas | |
| 7,077,147 B2 | 7/2006 | Louie et al. | |
| 7,111,634 B2 | 9/2006 | Louie | |
| 7,137,399 B1 | 11/2006 | Ransom et al. | |
| 7,143,553 B2 | 12/2006 | Fritsche et al. | |
| D536,872 S | 2/2007 | Kellogg et al. | |
| 7,178,538 B2 | 2/2007 | Ransom | |
| D541,747 S | 5/2007 | Bernardini | |
| 7,228,820 B1 | 6/2007 | Kellogg et al. | |
| D546,005 S | 7/2007 | Harper | |
| D547,950 S | 8/2007 | Kellogg et al. | |
| D551,452 S | 9/2007 | Kellogg et al. | |
| D555,854 S | 11/2007 | Kamiya | |
| D555,905 S | 11/2007 | Kellogg et al. | |
| D571,054 S | 6/2008 | Donnelly | |
| 7,472,715 B2 * | 1/2009 | Zheng | A63B 9/00 135/117 |
| 7,481,182 B2 | 1/2009 | Simpson | |
| 7,484,520 B2 | 2/2009 | Zheng | |
| 7,523,719 B2 | 4/2009 | Miller | |
| D601,800 S | 10/2009 | Kellogg et al. | |
| 7,607,446 B2 | 10/2009 | Zheng | |
| D608,954 S | 1/2010 | Tharp | |
| D610,352 S | 2/2010 | Kellogg et al. | |
| D612,117 S | 3/2010 | Krotts et al. | |
| 7,703,228 B2 | 4/2010 | Zheng | |
| 7,703,416 B2 | 4/2010 | Farmer et al. | |
| D615,251 S | 5/2010 | Scherbing | |
| 7,721,678 B2 | 5/2010 | Jakubowski et al. | |
| D622,466 S | 8/2010 | Sabounjian | |
| D622,960 S | 9/2010 | Sabounjian | |
| 7,789,044 B2 | 9/2010 | McGrade | |
| 7,802,540 B2 | 9/2010 | Jakubowski | |
| D625,891 S | 10/2010 | Krotts et al. | |
| 7,845,507 B2 | 12/2010 | Kellogg et al. | |
| 7,938,085 B1 | 5/2011 | Tsengas | |
| 8,047,391 B2 | 11/2011 | Lu | |
| 8,127,719 B2 | 3/2012 | Jakubowski et al. | |
| 8,171,888 B2 | 5/2012 | Chou | |
| 8,176,877 B2 | 5/2012 | Chou | |
| D661,900 S | 6/2012 | Krotts | |
| D662,264 S | 6/2012 | Chau et al. | |
| D670,112 S | 11/2012 | Malone | |
| D671,691 S | 11/2012 | Nellan | |
| D680,329 S | 4/2013 | Krotts | |
| D685,139 S | 6/2013 | Park | |
| D691,688 S | 10/2013 | Pescovitz | |
| D691,689 S | 10/2013 | Pescovitz | |
| D691,690 S | 10/2013 | Pescovitz | |
| D711,107 S | 8/2014 | Krotts | |
| D717,005 S | 11/2014 | Skaggs | |
| D721,232 S | 1/2015 | Krotts | |
| D739,656 S | 9/2015 | Krotts | |
| 2002/0100431 A1 | 8/2002 | Sherman | |
| 2002/0112753 A1 | 8/2002 | Louie | |
| 2003/0111102 A1 | 6/2003 | Henley et al. | |
| 2003/0127059 A1 | 7/2003 | Smith | |
| 2003/0213511 A1 | 11/2003 | Louie | |
| 2003/0221924 A1 | 12/2003 | Tong | |
| 2004/0129307 A1 | 7/2004 | Louie et al. | |
| 2005/0229866 A1 | 10/2005 | Simpson | |
| 2006/0112621 A1 | 6/2006 | White | |
| 2006/0150917 A1 | 7/2006 | Morton | |
| 2006/0174841 A1 | 8/2006 | Axlerod | |
| 2006/0186119 A1 | 8/2006 | Zheng | |
| 2006/0213452 A1 | 9/2006 | King | |
| 2007/0079548 A1 | 4/2007 | Bakowski | |
| 2008/0056625 A1 * | 3/2008 | Stanton | B65F 1/0006 383/104 |
| 2008/0072837 A1 | 3/2008 | Redzisz et al. | |
| 2008/0245313 A1 | 10/2008 | Jakubowski et al. | |
| 2009/0090709 A1 | 4/2009 | Shalomoff | |
| 2009/0101075 A1 | 4/2009 | Matlack | |
| 2009/0114648 A1 * | 5/2009 | Kellogg | D06F 95/004 220/9.3 |
| 2009/0314219 A1 | 12/2009 | Bryson | |
| 2010/0018968 A1 * | 1/2010 | Sabounjian | 220/9.2 |
| 2010/0089336 A1 * | 4/2010 | Flannery et al. | 119/498 |
| 2010/0313824 A1 | 12/2010 | Northrop | |
| 2011/0173233 A1 | 7/2011 | Lush | |
| 2011/0174811 A1 * | 7/2011 | Sabounjian | 220/9.2 |
| 2011/0308476 A1 | 12/2011 | Chang | |

(56) References Cited

U.S. PATENT DOCUMENTS

| | | | |
|---|---|---|---|
| 2012/0186533 A1* | 7/2012 | Lu | ................................ 119/497 |
| 2013/0075393 A1 | 3/2013 | Haynie | |

FOREIGN PATENT DOCUMENTS

| | | |
|---|---|---|
| DE | 30 13 178 | 11/1981 |
| DE | 41 14 916 | 11/1991 |
| FR | 589062 | 5/1925 |
| FR | 1215335 | 11/1959 |
| FR | 1380728 | 12/1964 |
| FR | 1380738 | 2/1990 |
| FR | 2635136 | 2/1990 |
| GB | 1367 | 5/1871 |
| GB | 5939 | 10/1915 |
| GB | 140570 | 4/1920 |
| GB | 2097244 A | 11/1982 |
| GB | 2126535 | 3/1984 |
| GB | 2212114 | 7/1989 |
| JP | 6-42227 | 2/1994 |

OTHER PUBLICATIONS

"Magic Maaze" Frongate Mail-Order Catalog, Summer 1995, p. 32.
Playhut brochure, date unknown.
Eileen Edinger letter, dated May 25, 1993.
Eileen Edinger Douglas letter, dated Aug. 26, 1996.
Patent Application re: prior art product sold in U.S. By Stephen A. Fausel and Paul S. Ziglar; specification for Collapsible Furniture, Jun. 1985.
Precision Pet Soft Side Pet Crate, www.petsupplies.com, dated Mar. 6, 2013, 2 pages.
Generation II Portable Soft Dog Crate, www.petsupplies.com, dated Mar. 6, 2013, 2 pages.
Twist n Go Softsided Dog Kennel, ww.pet-discount-store.com, dated Mar. 6, 2013, 2 pages.
SportPet Pop-Open Kennel, Small, www.walmart.com, dated Mar. 6, 2013, 1 page.
Boots & Barkley® Large Pop Open Dog Kennel, www.target.com, dated Mar. 6, 2013, 1 page.
Twist-N-Go Kennel, Lg., www.waremfginc.com , dated Mar. 6, 2013, 2 pages.
May 12, 2017—Nonfinal Office Action in related U.S. Appl. No. 14/018,566.
May 22, 2017—Nonfinal Office Action in related U.S. Appl. No. 14/290,692.
Aug. 16, 2017—Final Office Action in related U.S. Appl. No. 14/018,566.

* cited by examiner

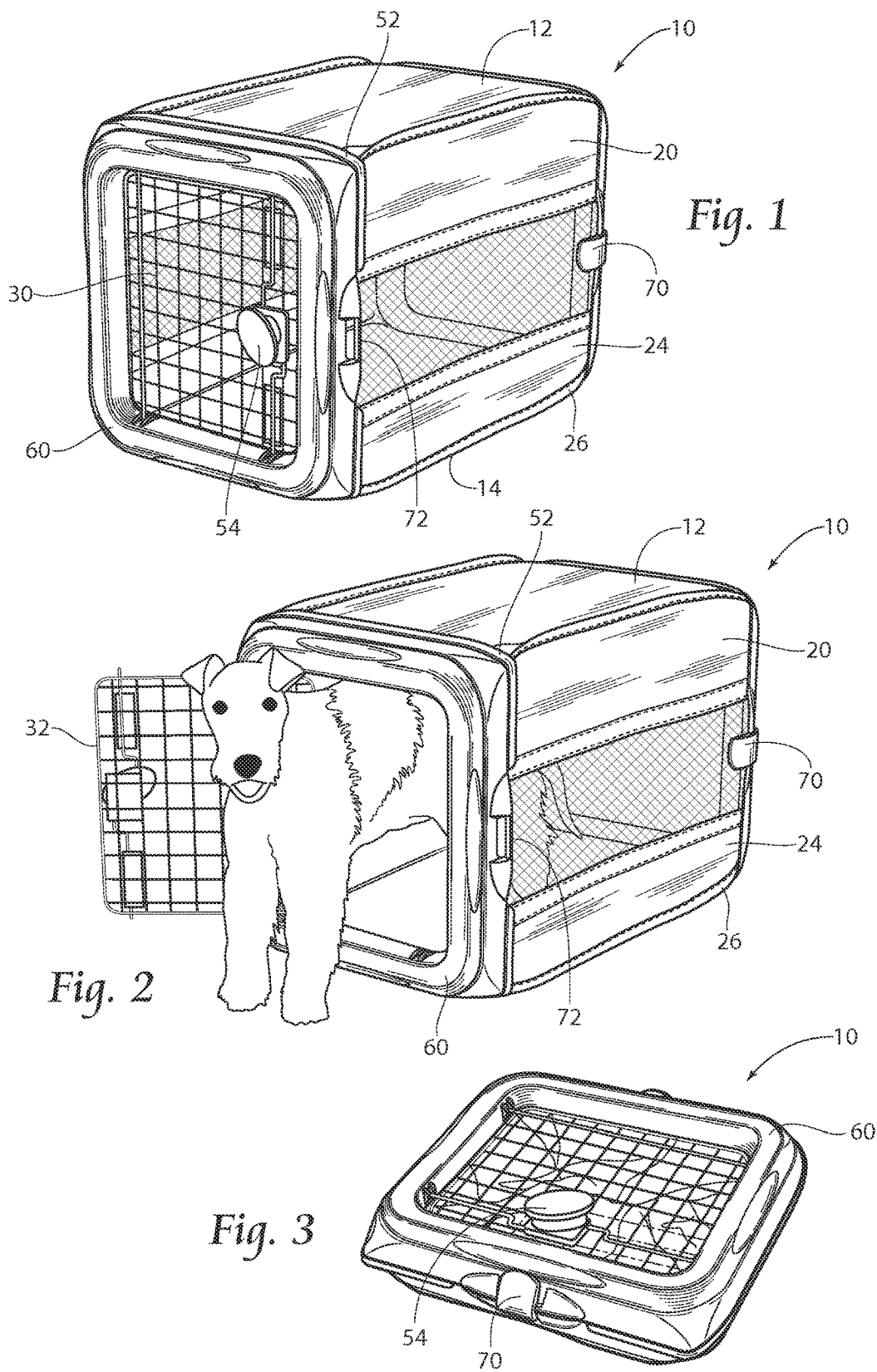

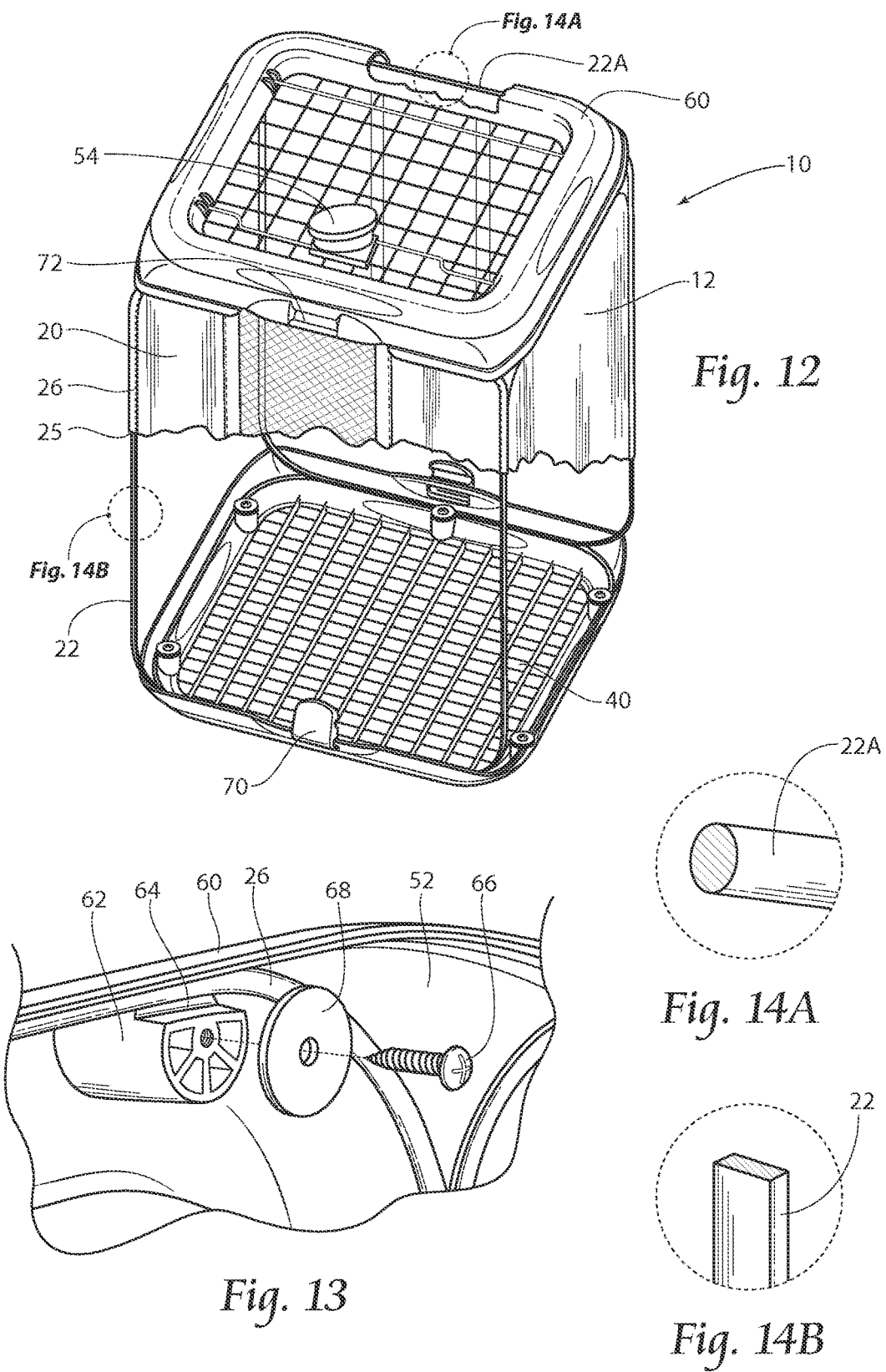

COLLAPSIBLE KENNEL

BACKGROUND OF THE INVENTION

The present invention relates generally to collapsible structures and specifically to a collapsible container for use by pets.

Certain devices are known in the art to provide an enclosure or structure for temporarily containing or for transporting a pet or other objects. For example, U.S. Pat. No. 6,539,895 to Hoagland teaches a portable pet carrier having a top portion, a middle section and a bottom portion made primarily from a molded synthetic material, with the top portion having a handle-like structure for carrying the assembled pet carrier and the middle portion having holes for ventilation and a door or window-like structure for placing a pet in or removing a pet from the carrier. Other pet enclosures are known in the art to be collapsible. These devices commonly have a square footprint and a domed configuration, which creates a pet enclosure that is larger than necessary because of unutilized space. As the size of the enclosure increases, its cost increases and its integrity decreases.

The prior art pet enclosures are voluminous in their expanded state, are either non-collapsible or are uneasy to fold or collapse, are still relatively voluminous in their collapsed state, and are difficult to manipulate. These configurations require more space, consume more materials, and require stronger collapsible framing than are necessary to efficiently contain or transport pets or other objects. The present invention solves the above-mentioned shortcomings and provides a convenient, easy to manipulate, and more efficiently sized ergonomic enclosure for containing and transporting pets or other objects.

SUMMARY OF THE INVENTION

The present invention relates generally to a collapsible structure and specifically to a collapsible structure for use as an animal kennel and method of making and using the same.

According to the present invention, the foregoing and other advantages are obtained by providing a collapsible kennel comprising a plurality of panels including opposed side panels, a top panel, and a floor panel, forming an enclosure having two ends, one end having an opening. In the preferred embodiment, each side panel comprises a flexible continuous loop frame, a web of material, and an edging material. The edging material envelops the loop frame and is coupled to the periphery of the web. Each end includes a periphery having an edging material. The edging material envelops a loop frame in a manner similar to that of the side panels. Each end is further provided with a rigid border member to support either a kennel door for ingress and egress, or a mesh panel as will be discussed, thus forming the structure.

A preferred method of manufacturing the collapsible kennel includes the steps of coupling edging to selected webs such that the edging surrounds the perimeter of the web and forms a channel or pocket through which the frame will later be inserted. After the requisite number of side panels having edging has been formed, opposed sides of the floor panel are each attached to the bottom side of a side panel. Next, the top side of each side panel is connected with opposed sides of the top panel. A flexible frame for each side panel is inserted through the channel formed by each edging. The ends of each frame member are connected, preferably using a crimped butt connector, to give the collapsible kennel its ability to freely stand in a rigid, expanded, upright state. Next, an edging is coupled to the periphery of each end and a flexible frame for each periphery is inserted through the channel formed by each edging. The ends of each frame member are connected in manner similar to that used for the side panels. A rigid border member is attached to each end. The rigid border members are adapted to support closure structures such as a kennel door or ventilated mesh webbing.

From the expanded state, the kennel can be folded and collapsed for storage or transportation. The preferred steps of collapsing the kennel include grasping the rigid border member of the entrance end and rotating it 180° while compressing the side panels until the side panels are spiraled against each other and the rigid border members are adjacent and overlay each other. While the kennel is now collapsed, downward pressure is required to prevent the kennel from springing back into an expanded state. Next, the fastener members on a rigid border member are pivoted to catch a corresponding latch member on an opposite rigid border member to thereby hold the kennel in the collapsed state for storage.

BRIEF DESCRIPTION OF THE DRAWINGS

FIG. 1 is a perspective view of a collapsible kennel according to the present invention.

FIG. 2 is a perspective view similar to that of FIG. 1, but showing the door open with a dog inside.

FIG. 3 is a perspective view of the kennel in collapsed condition.

FIG. 12 is a cutaway view of the collapsible kennel illustrating the interrelationship of the various components in while in expanded condition.

FIG. 13 is a fragmentary cutaway view showing attachment of a rigid frame member to the open end loop frame.

FIG. 14A is an enlarged cross sectional view of the loop frame used in the open ends.

FIG. 14B is an enlarged cross sectional view similar to that of FIG. 14A, but showing the loop frame used in the side panels.

DESCRIPTION OF THE PREFERRED EMBODIMENT

Figure 4:
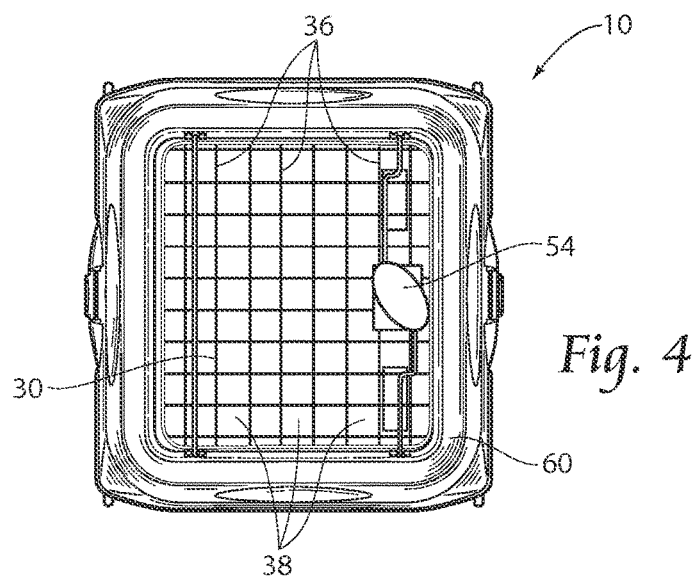
FIG. 4 is a front plan view of the collapsible kennel.
Figure 5:
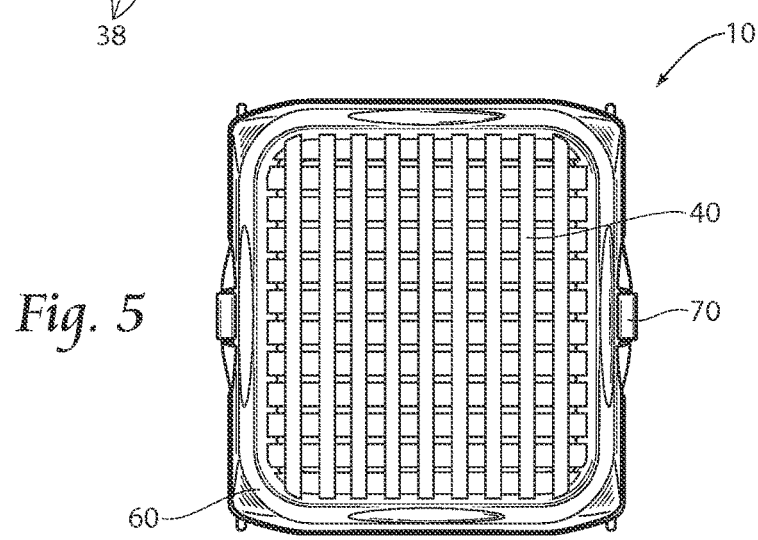
FIG. 5 is a rear plan view of the collapsible kennel.
Figure 6:
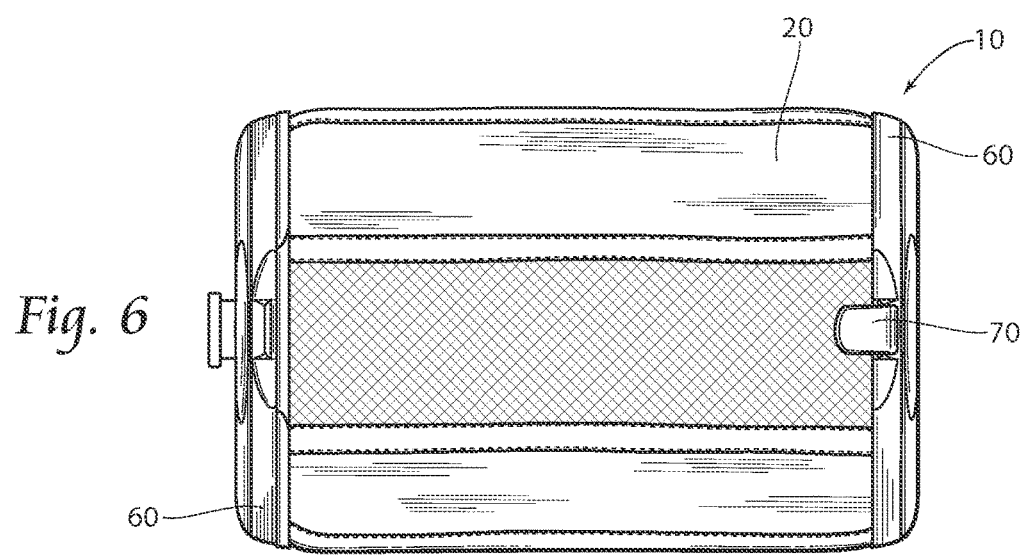
FIG. 6 is a side plan view of the collapsible kennel.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

As shown in the Figures, a collapsible enclosure 10 according to the present invention comprises a top panel 12, a bottom panel 14, two side panels 20, a front panel 30 having a door 32, and a rear panel 40. The top panel 12, bottom panel 14, two side panels 20, front panel 30, and rear panel 40 are connected to one another to form a substantially rectangular enclosure 10 having the door 32 for ingress and egress.

Referring to FIGS. 1-6 and 15 it may be seen that each side panel 20 comprises a frame 22, a web 24, and an edging 26. The frame 22 is flexible, preferably formed from a sufficiently stiff yet resilient material such as spring steel wire or plastic, and may form a loop that may or may not be continuous. Preferably, the frame 22 has a rectangular cross-section, as seen in FIG. 14B. The frame 22 is contained within the channel or pocket 25 formed by the edging 26 (best seen in FIG. 15). The webs 24 are a flexible foldable material, such as nylon cloth or nylon mesh, but can be any suitably flexible material. The nylon, or other flexible material, may be solid or perforated. The perimeter of the web 24 is stitched to the edging 26 such that the edging 26 forms a pocket 25 about the periphery of the web 24. The edging 26 is a foldable, but stretch-resistant material capable of housing the frame 22 within its pocket 25.

Figure 15:
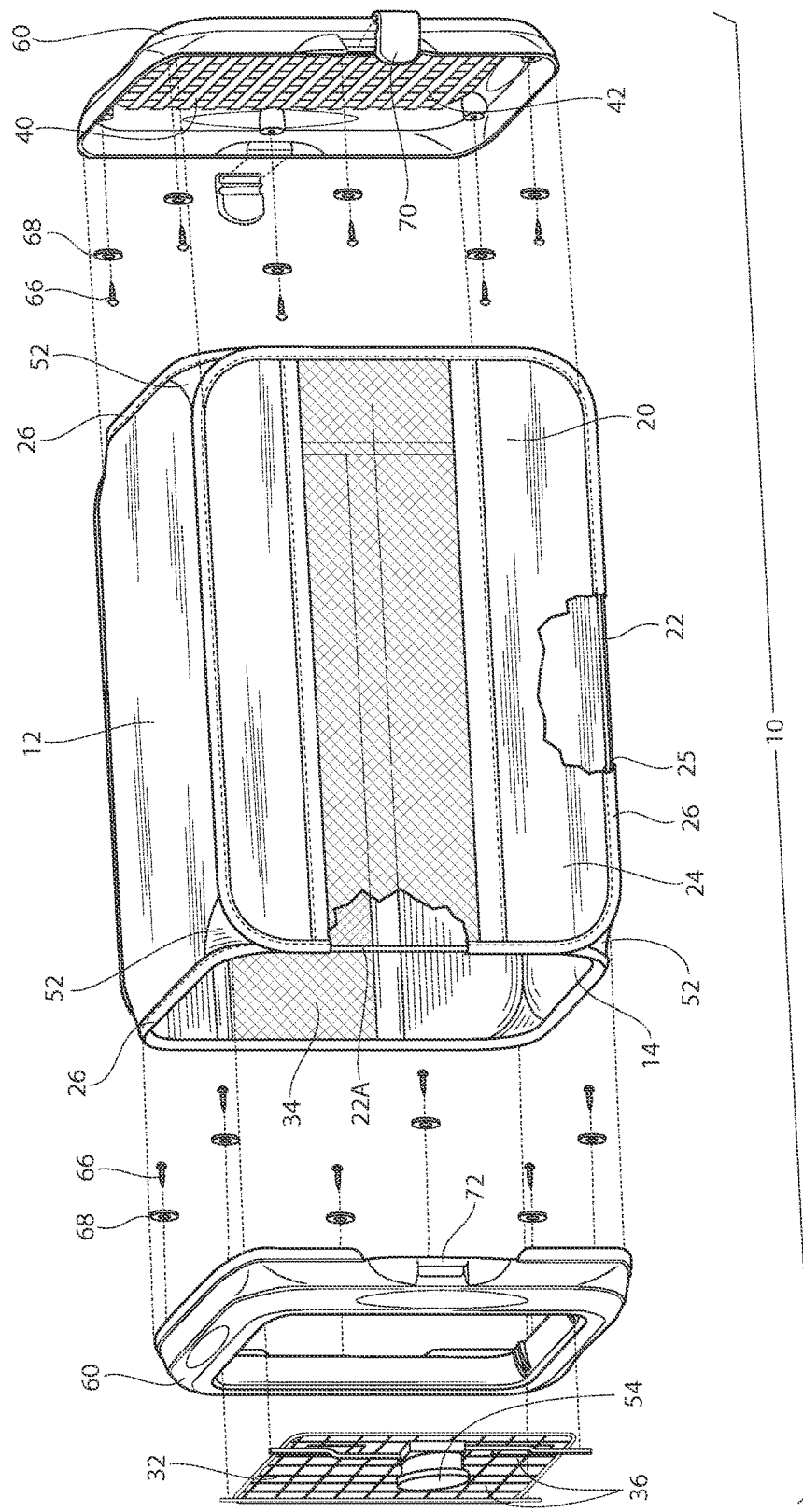
FIG. 15 is an exploded view of the collapsible kennel.
Figure 16:
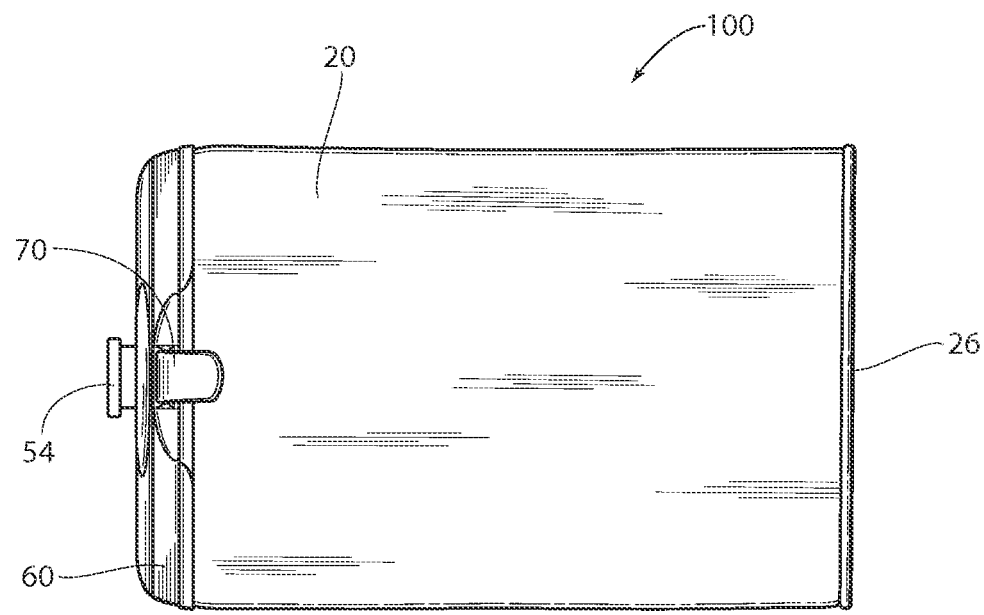
FIG. 16 is a side plan view, similar to FIG. 6, but showing an alternative collapsible kennel.
Figure 17:
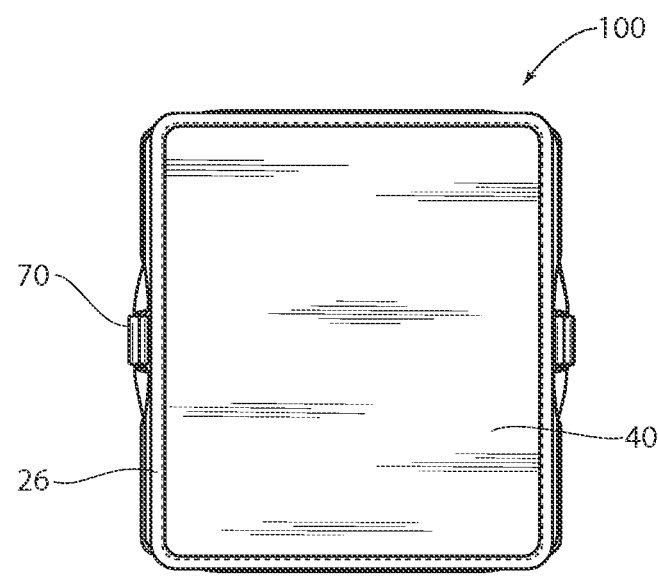
FIG. 17 is a rear plan view of the collapsible kennel illustrated in FIG. 16.

As best seen in FIGS. 1 and 15, the top panel 12 and bottom panel 14 preferably each comprise a continuous and non-interrupted foldable material. Each side panel web 24 preferably comprises a continuous and non-interrupted mesh material, or alternatively, may comprise a combination of mesh material and non-mesh foldable material.

With particular reference now to FIG. 15, the front panel 30 is seen to have a generally rectangular shape having a periphery that defines a front opening 34. Further seen is the rear panel 40 which also has a generally rectangular shape having a periphery. The periphery of both the front panel 30 and the rear panel 40 includes an edging 26. The edging 26 forms a pocket 25 about the periphery of the front panel 30 and the rear panel 40 and, similar to the edging 26 discussed in conjunction with the side panels 20, is a foldable, but stretch-resistant material capable of housing a frame 22A within its pocket 25. As seen in FIG. 14A, the frame 22A used in conjunction with the front panel 30 and the rear panel 40 preferably has a round cross section. In construction, the top panel 12 and the bottom panel 14 each include four corner sections 52 which are attached to four substantially perpendicular sides of each side panel 20, the front panel periphery, and the rear panel periphery.

With reference now to FIGS. 13 and 15, a rigid border member 60 is positioned over and is attached to the edging 26 of the front panel 30. As seen, the rigid border member 60 may include a mounting element 62 having an abutment 64 to support the frame 22A in its pocket 25. The abutment 64 may be further adapted to receive a fastener, such as the screw 66 and washer 68 combination shown. A door member 32 is preferably positioned within the rigid border member 60 and provides ingress and egress for the enclosure 10. A door 32 for use with the present invention may be any suitable kennel-type door structure. The door structure 32 illustrated is a grate-type structure and includes a plurality of cross bars 36 which may be spaced to define transversely spaced openings 38 configured to permit airflow, visibility, and retain a pet as desired. The cross bars 36 may also be configured to engage and be supported by the rigid border member 60 for attachment thereto. A knob 54 or other latching mechanism may be further provided for latching access to the container 10.

In a manner similar to that of the front panel 30, a rigid border member 60 is positioned over and is attached to the edging 26 of the rear panel 40. As with the front panel 30, the rigid border member 60 used in conjunction with the rear panel 40 may include a mounting element 62 adapted to support the frame 22A in its pocket 25 and further to receive a fastener such as the screw 66 and washer 68 combination shown in FIGS. 13 and 15. A woven air permeable mat 42 or other similar material is preferably positioned within the rear rigid border member 60 and provides enhanced air circulation for the enclosure 10 when used as a pet kennel. One of the rigid border members 60 is further preferably provided with latches 70 which may be moved between open and closed positions. The latches 70 engage corresponding protruding catches 72 on the opposite rigid border member 60 to thereby hold the kennel in the collapsed state for storage, as will be discussed.

Although stitching is presented as the preferred means for attaching or connecting the elements of the kennel 10 and permitting relatively convenient folding of the kennel 10, it is to be understood that other methods of attachment can be used in this invention. Such other methods may include heat sealing, gluing and the like. Accordingly, construction of the collapsible kennel should not be limited to stitching alone.

Figure 7:
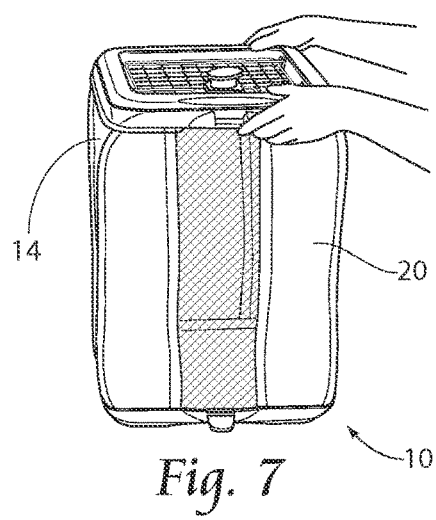
FIGS. 7-11 depict a method of collapsing the collapsible kennel, and using a fastener and latch system to hold the collapsed kennel in the collapsed state.
Figure 8:
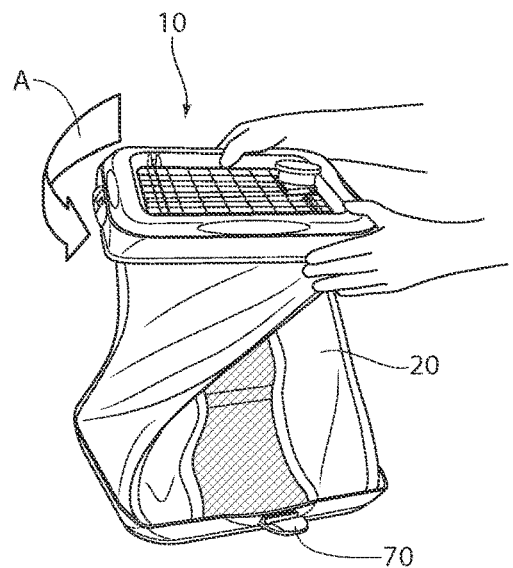
Figure 9:
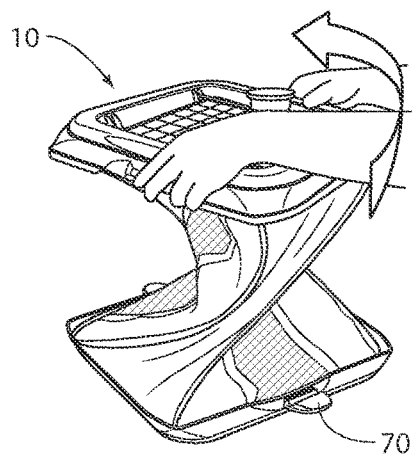
Figure 10:
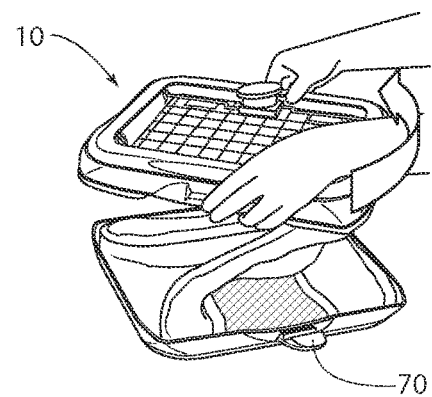
Figure 11:
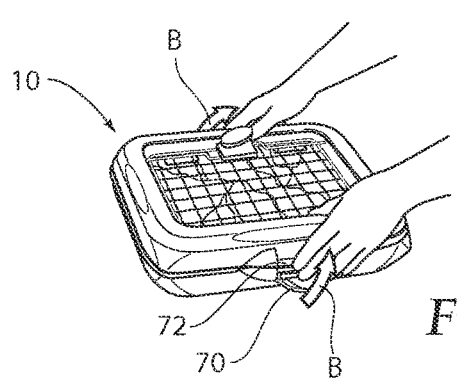

From the expanded state, the kennel 10 may be folded into a collapsed state for storage and transportation. FIGS. 7 to 11 show various steps for collapsing the kennel 10. Referring to FIG. 7, the first step requires positioning the kennel with the front panel 30 on top, grasping the rigid border member 60 and rotating 180° in the direction of arrow A while compressing the side panels 20 until the side panels 20 are spiraled against each other and the rigid border members 60 are adjacent and overlay each other. The kennel 10 is now collapsed, but downward pressure is still required to prevent the kennel 10 from springing back into an expanded state. FIG. 11 shows the final step of pivoting the latch members 70 on a rigid border member 60 in the direction of arrow B to catch a corresponding catch member 72 on an opposite rigid border member 60 to thereby hold the kennel in the collapsed state for storage.

When the latch members 70 are uncoupled from the latch members 72, the frame members 22 will bias the kennel 10 into its fully expanded state. Again, the fully expanded state of the embodiment is that shown in FIG. 1.

With attention now to FIGS. 16-21, another embodiment of a collapsible kennel 100 may be seen. Similar to the previously described device 10, the collapsible kennel 100 in these views comprises a top panel 12, a bottom panel 14, two side panels 20, a front panel 30 having a door 32, and a rear panel 40. The top panel 12, bottom panel 14, and two side panels 20 are connected to one another to form a substantially rectangular enclosure 100. The panels 12, 14, and 20 may be formed from a flexible foldable material, such as nylon cloth or nylon mesh, but can be any suitably flexible material. Further, the material may be solid or perforated.

Figure 18:
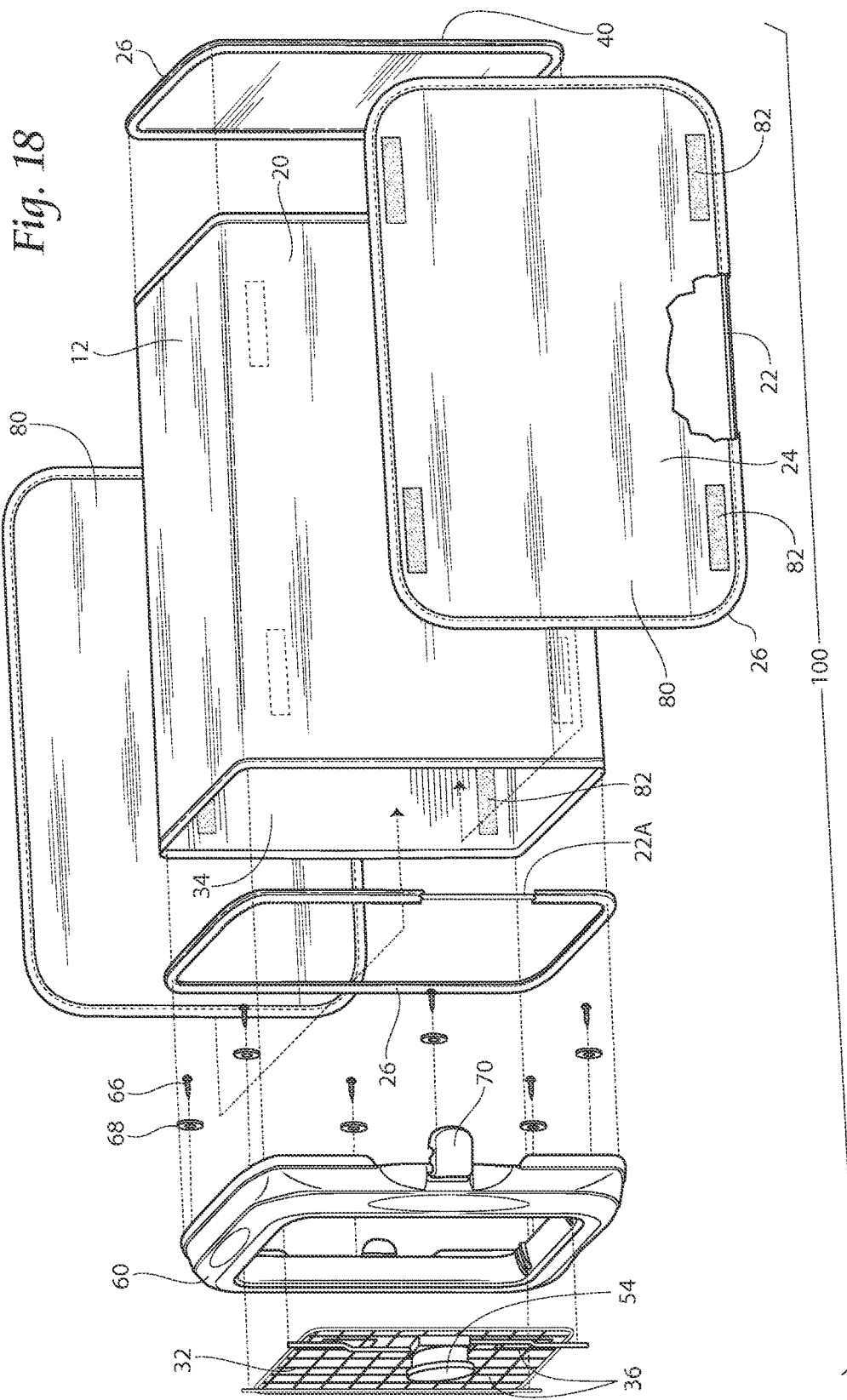
FIG. 18 is an exploded view of the collapsible kennel illustrated in FIGS. 16 and 17.

Referring particularly to FIG. 18 it may be seen that the front panel 30 and the rear panel 40 each include a frame 22 and an edging 26. The frame 22 is flexible, preferably formed from a sufficiently stiff yet resilient material such as spring steel wire or plastic, and may form a loop that may or may not be continuous. The frame 22 is contained within the channel or pocket 25 formed by the edging 26.

As may be further seen in the view of FIG. 18, the device 100 may further include a plurality of insert panels 80. The insert panels 80 provide shape and rigidity to the device 100 while in the expanded condition. As viewed, the insert panels 80 each comprise a frame 22, a web 24, and an edging 26. Similar to frames 22 described previously, the frames 22 utilized in the insert panels 80 are flexible, preferably formed from a sufficiently stiff yet resilient material such as spring steel wire or plastic that may form a loop that may or may not be continuous. The frame 22 is contained within the channel or pocket 25 formed by the edging 26. The webs 24 are a flexible foldable material, such as nylon cloth or nylon mesh, but can be any suitably flexible material. The nylon, or other flexible material, may be solid or perforated. The perimeter of the web 24 is stitched to the edging 26 such that the edging 26 forms a pocket 25 about the periphery of the web 24. The edging 26 is a foldable, but stretch-resistant material capable of housing the frame 22 within its pocket 25. The insert panels 80 may be further provided with means for attachment to the side panels 20, such as the hook and loop fasteners 82 shown. In use, the insert panels 80 are placed in the device 100 and positioned adjacent the side panels 20 for rigidity, as will be discussed.

With further reference to FIG. 18, a rigid border member 60 is positioned over and is attached to the edging 26 of the front panel 30. As illustrated, and similar to the rigid border member 60 discussed with regard to FIGS. 1-15, the rigid border member 60 shown in this view may include a mounting element 62 (see FIG. 13) to support the frame 22 in its pocket 25. As in the previous embodiment, an abutment 64 such as that shown in FIG. 13 may be further adapted to receive a fastener, such as the screw 66 and washer 68 combination shown. A door member 32 is preferably positioned within the rigid border member 60 to provide ingress and egress for the enclosure 100. A door 32 for use with the present invention may be any suitable kennel-type door structure, such as the grate-type structure illustrated. As in the previous embodiment, the door 32 may include a plurality of cross bars 36 which may be spaced to define transversely spaced openings 38 configured to permit airflow, visibility, and retain a pet as desired. The cross bars 36 may also be configured to engage and be supported by the rigid border member 60 for attachment thereto. A knob 54 or other latching mechanism may be further provided for latching access to the container 100.

With regard to the rear panel 40, a web 24 may be attached to the edging 26 in a manner similar to that of the insert panels 80. The web 24 may perforate or imperforate, as desired and formed from any suitably flexible material. The rigid border member 60 attached to the front panel 30 is further preferably provided with latches 70 which may be moved between open and closed positions. The latches 70 engage the edging 26 of the rear panel 40 to thereby hold the kennel in the collapsed state for storage, as will be discussed.

Figure 19:
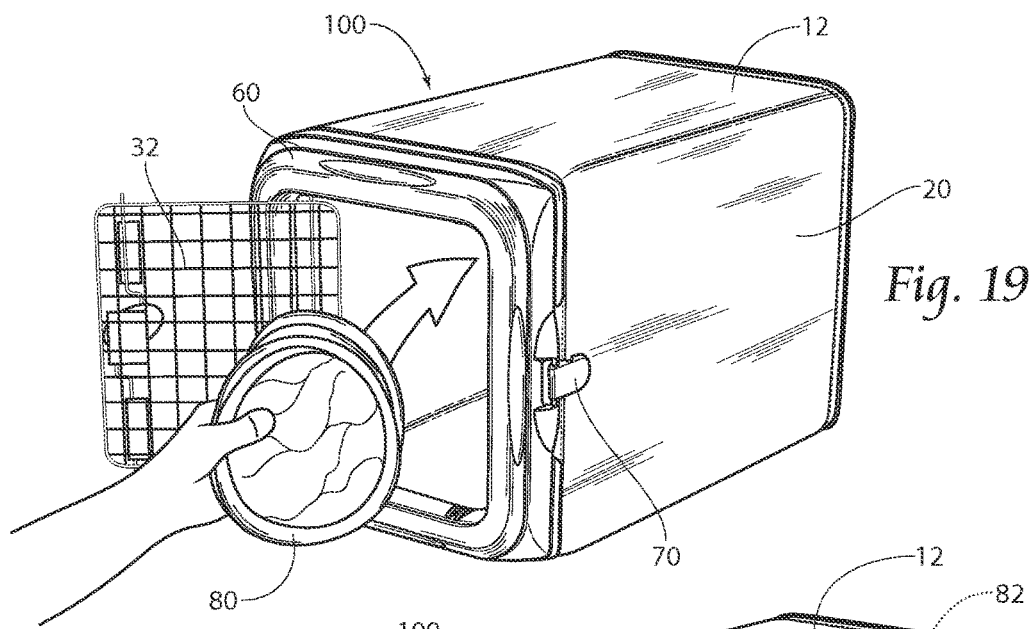
FIGS. 19 and 20 illustrate a method of expanding the kennel shown in FIGS. 16-18.
Figure 20:
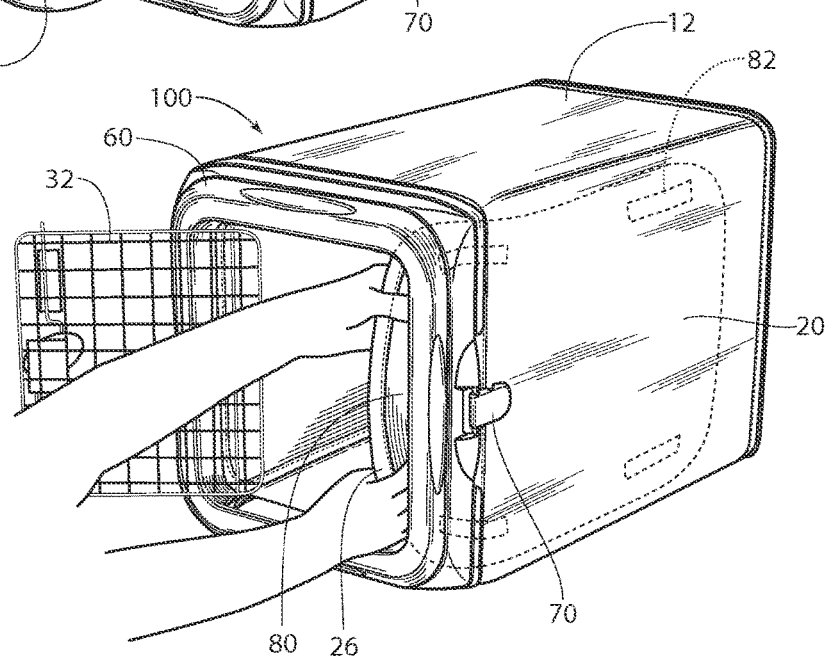
Figure 21:
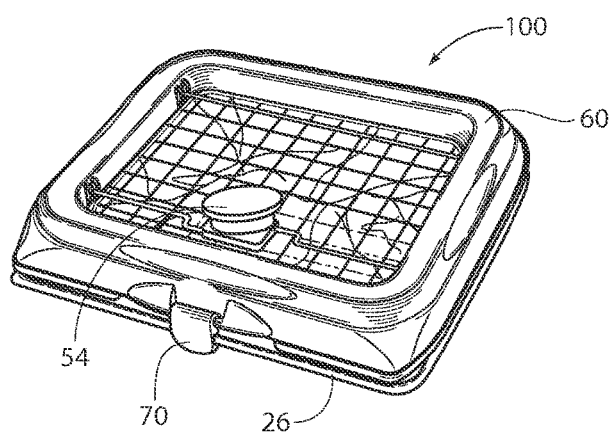
FIG. 21 is a perspective view of the kennel illustrated in FIGS. 16-20, but in collapsed condition.

From the collapsed state, the kennel 100 may be opened into its expanded state for use. FIGS. 19 and 20 illustrate various steps for expanding the kennel 100 prior to use. Referring to FIG. 7, a first step includes placing a collapsed insert panel 80 into the kennel 100. As seen, the kennel 100 is in a generally expended condition, as the rigid border member 60 acts to hold the kennel opening 34 in an open position. When the collapsed insert panel 80 is released inside the kennel 100, the frame 22 biases the insert panel 80 into an expanded state. The insert panel 80 is then positioned adjacent a side panel 20, as is illustrated in FIG. 20. The insert panel 80 serves to provide added structure and rigidity to the side panel 20 and further aids in maintaining the kennel 100 in an expanded condition. As illustrated, multiple insert panels 80 may be contemplated in conjunction with the kennel 100, with a single insert panel 80 placed adjacent each respective side panel 20. Each insert panel 80 may be further provided with means for attachment to a respective side panel 20, such as the hook and loop fasteners 82 shown, although it is to be understood that other suitable attachment mechanisms may be considered such as tape, buttons or ties, by way of non-limiting examples. The kennel 100 may be collapsed in a manner similar to that described with reference to FIGS. 7-10, while leaving the insert panels 80 in place, if desired. FIG. 21 shows the final, collapsed condition of the kennel 100, with the latch members 70 on rigid border member 60 grasping the edging 26 of the rear panel 40 to thereby hold the kennel 100 in the collapsed state for storage and transportation.

The collapsed kennel 100 may be expanded when the latch members 70 are uncoupled from the edging 26. With the insert panels 80 in place within the collapsed kennel 100, the insert panel 80 frame members 22 will bias the kennel 100 into its fully expanded state shown in FIG. 16.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:
1. A collapsible pet kennel comprising:
a body including
a plurality of body panels, including opposed first and second side panels and opposed top and bottom panels;
a plurality of panel frames provided among the plurality of body panels, each of the plurality of panel frames constructed as a stiff, yet resilient continuous loop contained within a pocket formed by an edging of a corresponding one of the plurality of body panels; and
a first end frame and a second end frame opposite the first end frame, the first end frame and the second end frame being formed as a loop circumferentially attached to the plurality of body panels;
a first rigid border member directly attached to at least one of the first end frame and the plurality of panel frames at a first end of the body by engagement of a first plurality of fasteners into the first rigid border member for capturing the body without penetration thereof, wherein the first rigid border member forms a border frame within which a door of a grate-type construction having a plurality of cross bars is retained; and
a second rigid border member directly attached to at least one of the second end frame and the plurality of panel frames at a second end of the body by engagement of a second plurality of fasteners into the second rigid border member for capturing the body without penetration thereof, wherein the second rigid border member forms a border frame within which an air permeable mat is retained;
wherein the collapsible kennel is configured to transition from an expanded position to a collapsed position by collapsing of the first and second rigid border members together in combination with a relative rotation therebetween;

wherein the attachments of the first rigid border and the second rigid border member are maintained through the transition; and wherein the first rigid border member includes a first latching element and the second rigid border member includes a second latching element, and wherein the first and second latching elements are engageable to retain the collapsible kennel in the collapsed position.

2. The collapsible pet kennel of claim 1, wherein the first end frame is positioned within a first peripheral edging of stretch-resistant material and the second end frame is positioned within a second peripheral edging of stretch-resistant material.

3. The collapsible pet kennel of claim 1, wherein each of the first end frame and the second end frame is constructed as a stiff, yet resilient continuous loop.

4. The collapsible pet kennel of claim 1, wherein the collapsible kennel is configured to transition from the expanded position to the collapsed position by collapsing of the first and second rigid border members together in combination with a 180-degree relative rotation therebetween, such that the first and second latching elements are configured to transition from diametrically opposed positions to aligned positions.

5. The collapsible pet kennel of claim 1, wherein each of the first plurality of fasteners and each of the second plurality of fasteners includes a screw and a washer.

6. The collapsible pet kennel of claim 1, wherein in the expanded position, the body of the pet kennel defines a height and a width at each of the first and second end frames and further defines a length between the first and second end frames, and wherein the length is greater than the height and greater than the width.

7. The collapsible pet kennel of claim 1, wherein one of the first and second latching elements is a pivotable latch member and the other of the first and second latching elements is a catch member selectively latchable by the latch member.

8. A collapsible pet kennel comprising:
   a body having a first end and a second end, the body including
      a plurality of body panels extending between the first and second ends, including opposed first and second side panels and opposed top and bottom panels;
      a plurality of panel frames provided among the plurality of body panels, each of the plurality of panel frames constructed as a stiff, yet resilient continuous loop contained within a pocket formed by an edging of a corresponding one of the plurality of body panels; and
      a first end frame and a second end frame opposite the first end frame, the first end frame and the second end frame each being formed as a continuous loop circumferentially attached to the plurality of body panels; and
   a first rigid border member directly attached to the first end frame and the plurality of panel frames at the first end of the body by engagement of a first plurality of fasteners into the first rigid border member for capturing the body without penetration thereof, wherein the first rigid border member forms a border frame within which a door of a grate-type construction having a plurality of cross bars is retained;

wherein the collapsible kennel is configured to transition from an expanded position to a collapsed position by convergence of the first and second ends along a mutual axis in combination with a relative rotation therebetween about the mutual axis; wherein the relative rotation for transitioning from the expanded position to the collapsed position is a 180-degree relative rotation about the mutual axis;

wherein the attachment of the first rigid border is maintained through the transition, and wherein the first rigid border member is formed with a latching element configured to retain the collapsible kennel in the collapsed position.

9. The collapsible pet kennel of claim 8, wherein the body further includes a rear panel having a web of material spanning inside a peripheral edging thereof to close the second end of the body.

10. The collapsible pet kennel of claim 9, wherein the latching element is configured to engage the rear panel in the collapsed position.

11. The collapsible pet kennel of claim 9, wherein the rear panel material web is a web of perforate material.

12. The collapsible pet kennel of claim 9, wherein the rear panel material web is a web of imperforate material.

13. The collapsible pet kennel of claim 8, wherein in the expanded position, the body of the pet kennel defines a height and a width at each of the first and second ends and further defines a length between the first and second ends, and wherein the length is greater than the height and greater than the width.

14. The collapsible pet kennel of claim 8, further comprising a second rigid border member directly attached to the second end frame and the plurality of panel frames at the second end of the body by engagement of a second plurality of fasteners into the second rigid border member for capturing the body without penetration thereof, wherein the second rigid border member forms a border frame and includes a latching element engageable with the latching element of the first rigid border member to retain the collapsible kennel in the collapsed position.

15. The collapsible pet kennel of claim 14, wherein one of the latching elements of the first and second rigid border members is a pivotable latch member and the other is a catch member selectively latchable by the latch member.

16. The collapsible pet kennel of claim 8, further comprising at least one insert panel having a stiff, resilient loop frame and a material web spanning within the loop frame, wherein the insert panel is releasably attachable to at least one of the first and second side panels.

17. The collapsible pet kennel of claim 16, wherein the at least one insert panel is releasably attachable to at least one of the first and second side panels by respective hook and loop fasteners.

* * * * *